United States Patent [19]

Schimke

[11] 4,049,144
[45] Sept. 20, 1977

[54] LIQUID DISPENSING APPARATUS

[76] Inventor: Lloyd J. Schimke, Box 1272, Highway 2 East, Minot, N. Dak. 58701

[21] Appl. No.: 667,878

[22] Filed: Mar. 17, 1976

[51] Int. Cl.² .......................................... G01F 11/38
[52] U.S. Cl. ................... 222/448; 222/453; 285/12; 285/235; 285/DIG. 16
[58] Field of Search ............. 222/365, 452, 453, 448; 285/12, 235, DIG. 16

[56] References Cited

U.S. PATENT DOCUMENTS

| 1,869,059 | 7/1932 | Hanson | 285/235 X |
| 3,156,272 | 11/1964 | Indrunas | 285/235 X |
| 3,254,650 | 6/1966 | Colitto | 285/DIG. 16 |
| 3,563,463 | 2/1971 | Walker | 285/12 X |
| 3,848,774 | 11/1974 | Shimke | 222/453 X |
| 3,926,458 | 12/1975 | Dryden | 285/235 X |

Primary Examiner—Robert B. Reeves
Assistant Examiner—Fred A. Silverberg
Attorney, Agent, or Firm—Norman P. Friederichs

[57] ABSTRACT

An adapter suitable for connecting a liquid measuring device to a variety of liquid containers of different size and shape without necessitating the use of different adapters. The adapter includes a sleeve portion which is fitted over the mouth and neck of the liquid container, there being affected a seal between the liquid container and the adapter. The opposite end of the adapter is attachable to the inlet of a liquid measuring device.

10 Claims, 6 Drawing Figures

LIQUID DISPENSING APPARATUS

BACKGROUND OF THE INVENTION

It has long been desirable to uniformly control the amount of liquid dispensed from a bottle or other container. This is particularly important in the bar and tavern business where tight inventory control is essential to making a profit. To accomplish this, various types of liquid measuring devices have been developed for use in conjunction with liquid containers of various sizes and shapes. The applicant himself is the inventor of one such apparatus, embodied in U.S. Pat. No. 3,848,744.

One of the problems associated with the prior art measuring devices has been the manner in which the liquid container is adapted to the measuring device. The fact that there is no standard size and shape for liquid containers in the past has necessitated the use of different adapters for different types of liquid containers. For this reason, the applicant has used at least six different adapters in conjunction with his measuring device.

This can make the use of measuring devices cumbersome and expensive, particularly in commercial establishments. In such instances, due to the variety of liquid containers that will be used, the proprietor must not only purchase a large number of dispensing caps, but must also purchase a variety of adapters. When a dispensing cap is removed from an empty liquid container and placed on another, if the liquid containers are different, a different adapter must be used. This requires time that might otherwise be used for more profitable activities.

SUMMARY OF THE INVENTION

The present invention solves the problems associated with the use of a variety of liquid containers of different size and shape. It is a purpose of the present invention to provide an adapter that can be used to adapt a dispensing device to any of a variety of liquid containers of different sized and shapes. This has been accomplished by providing the adapter with a flexible sleeve member that can be stretched over the mouth and neck of the liquid container. One end of the interior surface of the sleeve member contains female threads to receive liquid containers having male threads on their mouth and neck portions and thus form a seal between the liquid container and the adapter. The sleeve member is at least as long as it is in interior diameter so that when a liquid container having no male threads on its mouth and neck ortion is used, the sleeve member being stretched over the liquid container's mouth and neck, a seal is affected between the sleeve member and the mouth and neck portion of the liquid container.

A further purpose of this invention is to provide lateral support for the liquid container relative to the measuring device, i.e. to hold the measuring device in a fixed position relative to the liquid container.

It is another purpose of this invention to provide a gripable surface when a measuring device is used in conjunction with a liquid container.

DETAILED DESCRIPTION

Figure 1:
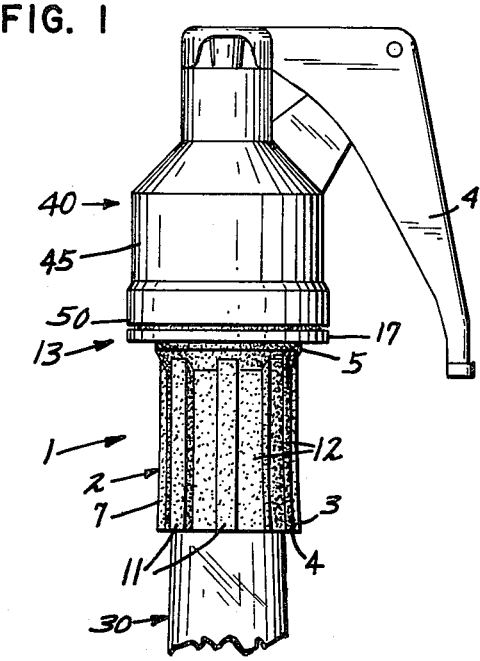
FIG. 1 is a fragmentary view in side elevation depicting a measuring device adapted for use on a liquid container.
Figure 2:
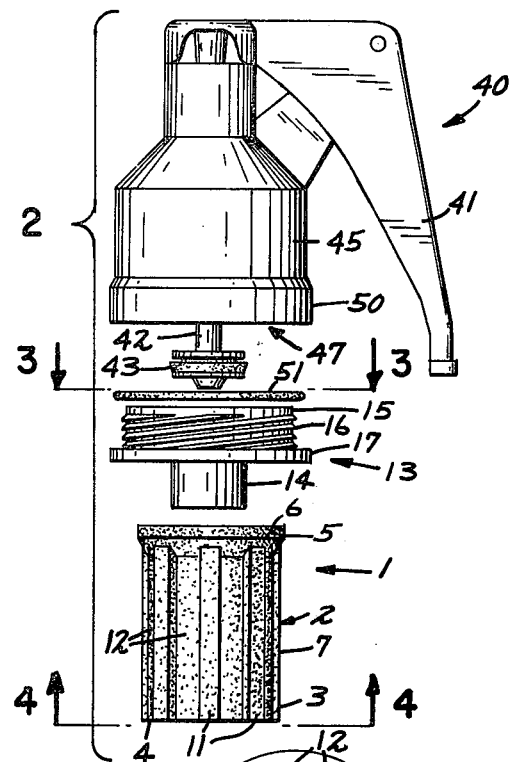
FIG. 2 is an exploded view in side elevation depicting a measuring device, the sleeve member, and the means by which the sleeve member is attached to the measuring device.
Figure 3:
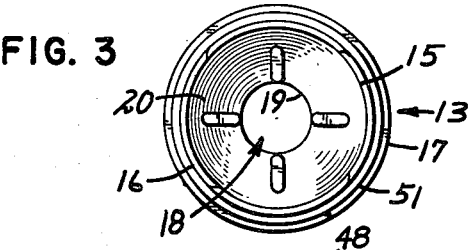
FIG. 3 is a plan view of the adapter taken along the line 3—3 of FIG. 2.
Figure 4:
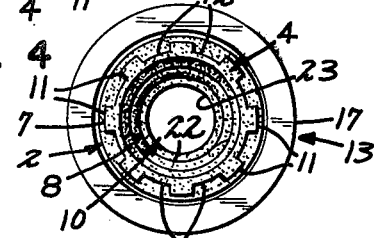
FIG. 4 is a plan view of the adapter taken along the line 4—4 of FIG. 2.

The adapter of the present application is particularly suited for connecting and securing a measuring device to bottles containing alcoholic beverages. The adapter has the feature that it can be used in conjunction with bottles having threaded mouth and neck portions as well as with those having only rounded lip portions. In either instance, an effective seal between the bottle and the adapter will be maintained to prevent leakage of the liquid. This is particularly useful to commercial liquor establishments that are required to use a large number of bottles of differing sizes and shapes. By use of the invention of the present application, the measuring device along with the adapter can be removed from a bottle of one size and shape and immediately replaced on another bottle of a different size and shape without changing adapters. This results in savings of both time and effort.

In order to provide strength and yet maintain a certain amount of flexibility, it is desirable that the sleeve member be constructed of a rubber-like material and be of sufficient thickness to provide lateral support to the bottle relative to the measuring device. To further this purpose, the preferred embodiment of the present invention includes ribs extending longitudinally along the outer surface of the flexible sleeve member. In addition to the added support for the bottle provided by these ribs, they provide a more grippable surface when used in conjunction with a measuring device of the type having a handle where the bottle must be gripped around its neck portion.

Referring to the Drawings, wherein like numbers refer to like elements, the adapter 1 comprises a cylindrical sleeve member 2 having an exterior surface 7, an interior surface 8 and a thickness 9, all defining a passageway 10 therethrough. The sleeve member 2 also has a first end portion 3 terminating in a first end 4 and a second end portion 5 terminating in a second end 6. A plurality of ribs 11, defining a plurality of grooves 12, are spaced around the exterior surface 7 of the sleeve member 2 at equal intervals and in a longitudinal direction. The interior surface 8 of the second end portion 5 contains female threads 22 for the purpose of engaging the male threads 32 found on the mouth and neck portions 31 of many liquid containers 30. The female threads 22 terminate at an interior lip 23. The length of the sleeve member 2 is at least as great as its interior diameter. Desireably, the length is at least 1 ½ times as great as the interior diameter of the sleeve member 2. This feature permits the sleeve member 2 to be stretched over the mouth and neck portion 37 of a bottle 35 to form a seal between the cylindrical sleeve member 2 and the bottle 35 at some point 38.

The adapter 1 further includes a base member 13 having a tubular neck 14 and an exteriorly threaded cylindrical portion 15 with a flange 17 positioned therebetween. 4-start male threads 16 are formed on the exteriorly threaded cylindrical portion 15. The base member 13 further includes a first interior surface 19 and a second interior surface 20 defining a funnel-shaped opening 18. The first interior surface has a generally cylindrical shape while the second interior surface has a generally frusto-conical shape tapering in a direction toward the first interior surface 19.

The second end portion 5 of the sleeve member 2 is attached by glue or other adhesive to the tubular neck 14 of the base member 13. This cause the first interior surface 19 of the base member 13 to be generally aligned with the interior surface 8 of the sleeve member 2.

As stated previously, the adapter 1 is particularly well suited for use in conjunction with a measuring device of the type disclosed by U.S. Pat. No. 3,848,774. The measuring device 40, as shown in the drawings, includes a handle 41 mechanically linked to a shaft 42 having a first valve disk 43 and a second valve disk 44. The measuring device 40 has a body 45 defining a measuring chamber 46 having an inlet 47 at the first end 50 of the measuring device and an outlet 48. The inlet 47 contains female threads 49.

In operation, the 4-start male threads 16 of the exteriorly threaded cylindrical portion 15 of the base member 13 engage the female threads 49 of the inlet 47 of the measuring device 40. A seal is formed when the flange 17 of the base member 13 is abutted against the first end 50 of the measuring device 40. An O-ring 51 is placed between the flange 17 of the base member 13 and the first end 50 of the measuring device 40 to provide a more efficient seal between the measuring device 40 and the adapter 1.

The first valve disk 43 is sized so that, upon operation of the handle 41, the shaft 42 moves in a direction toward the adapter 1 and the first valve disk 43 enters the opening 18 of the base member 13 and abuts the first interior surface 19 of the base member 13 to there affect a seal to prevent the passage of liquid through the adapter 1 and into the measuring chamber 46. For further details of the operation of the measuring device 40, refer to U.S. Pat. No. 3,848,774.

Figure 5:
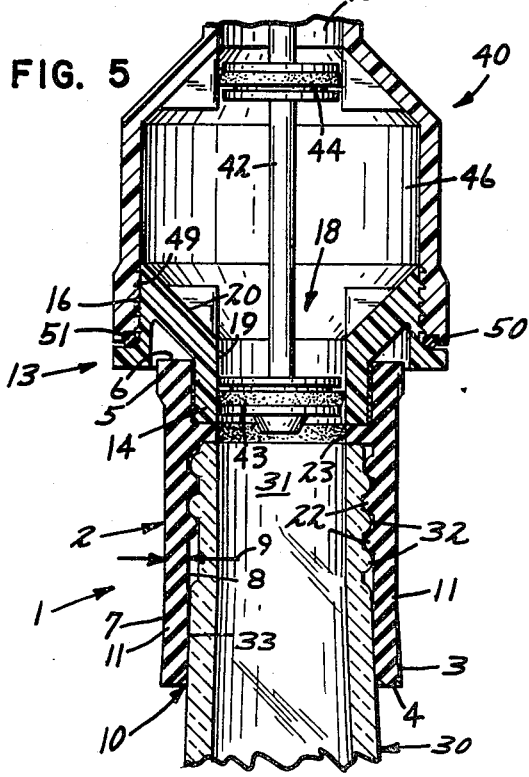
FIG. 5 is a fragmentary sectional view depicting a measuring device adapted for use in conjunction with a liquid container having male threads on its mouth and neck portions.
Figure 6:
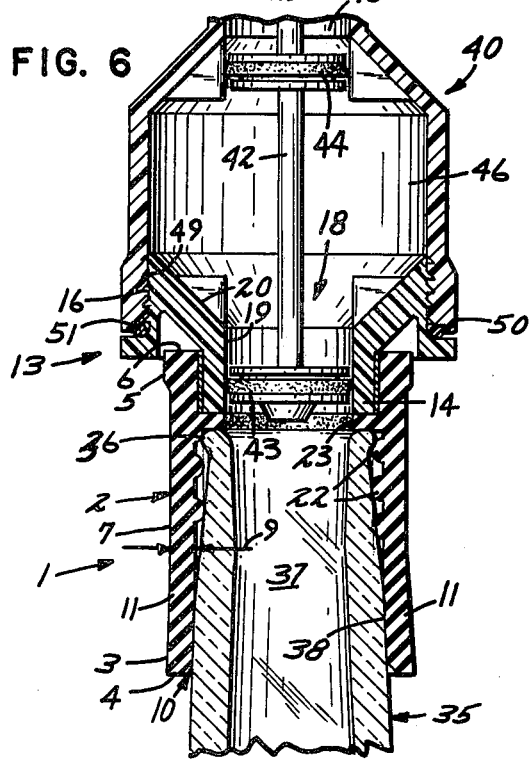
FIG. 6 is a fragmentary sectional view depicting a measuring advice adapted for use on a liquid container having no male threads on its mouth and neck portion.

The combination of the measuring device 40 and adapter 1 can be used in conjunction with liquid containers of various types. For use in conjunction with a bottle 30 having a mouth and neck portion 31 containing male threads 32 (FIG. 5) the first end portion 3 of the sleeve member 2 is stretched over the mouth and neck portion 31 of the bottle 30 and the bottle 30 is advanced until the male threads 32 of the mouth and neck portion 31 engage the female threads 22 located in the interior surface 8 of the second end portion 5 of the sleeve member 2. A seal is thus affected between the adapter 1 and the bottle 30. A further seal is affected at some point 33 along the mouth and neck portion 31 of the bottle 30 where the first end portion 3 of the sleeve member 2 abuts the surface of the mouth and neck portion 31. Alternatively, a bottle 35 (FIG. 6) having only a lip 36 on its mouth and neck portion 37 may be used in conjunction with a combination of the measuring device 40 and the adapter 1. In this case, the first end portion 3 of the sleeve member 2 is stretched over the mouth and neck portion 37 of the bottle 35 and bottle 35 advanced until the lip 36 of the mouth and portion 37 abuts the interior lip 23 of the sleeve member 2. A seal is affected at some point 38 along the mouth and neck portion 37 of the bottle 35 where the first end portion 3 of the sleeve member 2 abuts the surface of the surface of the mouth and neck portion 37.

In either case, upon inversion of the liquid container when the first valve disc 43 is in an open position, liquid will flow from the liquid container, through the adapter, and into the measuring device where the desired amount will be measured and dispensed.

What is claimed is:

1. An adapter for sealingly connecting a measuring device to a liquid container, said measuring device being adapted to sequentially remove a plurality of measured portions from said liquid container, said measuring device having an inlet portion and said liquid container having neck and mouth portions, said adapter comprising:
    a. a flexible, cylindrical sleeve member having an exterior surface and a tubular interior surface, the length of said sleeve member being at least as great as the interior diameter of said sleeve member, said sleeve member having first and second end portions, the interior surface of said first end portion being sealably abuttable against said liquid container inserted therein; and
    b. means for connecting said second end portion of said flexible sleeve member to the inlet of said measuring device, said means for connecting said second end portion of said flexible sleeve member to an inlet of a measuring device comprising a base member connected to said second end portion of said sleeve member, said base member defining an opening to permit the passage of liquid therethrough, said base member including a threaded portion for threadably engaging a measuring device and a flange positioned between said sleeve member and said threaded portion of said base member and abuttable against a measuring device for forming a seal between a measuring device and said adapter.

2. The adapter as recited in claim 1 wherein the interior surface of said second end portion comprises female threads.

3. The adapter as recited in claim 1 wherein said flexible sleeve member further comprises a plurality of ribs extending longitudinally along said exterior surface of said sleeve member and being spaced at equal intervals around said surface.

4. The adapter as recited in claim 1 wherein the length of said sleeve member is at least 1½ as great as the inner diameter of said sleeve member.

5. An adapter as recited in claim 1 wherein said threaded portion of said base member comprises a 4-start male thread.

6. In combination with a measuring device of the type having a body defining a measuring chamber with a cylindrical outlet located at the top of said chamber and a cylindrical inlet located at the bottom of said chamber, and means for selectively sealing each of said cylindrical outlet and cylindrical inlet while the other remains open, wherein said means are actuated by the action of a handle pivotally attached to said body, the improvement comprising:
    a. flexible, cylindrical sleeve member having an exterior surface and a tubular inner surface, the length of said sleeve member being at least as great as the interior diameter of said sleeve member, said sleeve member having first and second end portions, the interior surface of said first end portion being sealably abuttable against said liquid container inserted therein; and b. means for connecting said second end portion of said flexible sleeve member to said cylindrical inlet of said measuring chamber, said means for connecting said second end portion of said flexible sleeve member to said cylindrial inlet of said measuring chamber comprising a base member connected to said second end portion of said sleeve member, said base member defining an opening to permit the passage of liquid therethrough, said base member including a threaded portion for threadably engaging a measuring device; and a flange positioned between said sleeve member and said threaded portion of said base member and abuttable against said cylindrical inlet of said measuring chamber for forming a seal between said measuring device and said adapter.

7. The combination as recited in claim 6 wherein the interior surface of said second end portion of said flexible sleeve member comprises female threads.

8. The combination as recited in claim 6 wherein said sleeve member further comprises a plurality of ribs extending longitudinally along said exterior surface of said sleeve member, said ribs being spaced at equal intervals around said surface.

9. The combination as recited in claim 6 wherein the length of said sleeve member is at least 1½ time as great as the inner diameter of said sleeve member.

10. The combination as recited in claim 7 wherein said threaded portion of said base member comprises 4-start male threads.

* * * * *